(12) United States Patent
Shi

(10) Patent No.: US 9,376,141 B1
(45) Date of Patent: Jun. 28, 2016

(54) STEERING APPARATUS WITH MULTI-STEERING MODES

(71) Applicant: DongFeng Shi, Sammamish, WA (US)

(72) Inventor: DongFeng Shi, Sammamish, WA (US)

( * ) Notice: Subject to any disclaimer, the term of this patent is extended or adjusted under 35 U.S.C. 154(b) by 0 days.

(21) Appl. No.: 14/682,750

(22) Filed: Apr. 9, 2015

(51) Int. Cl.
| | |
|---|---|
| *B62D 9/00* | (2006.01) |
| *B62D 7/15* | (2006.01) |
| *B60K 7/00* | (2006.01) |
| *B62D 5/00* | (2006.01) |
| *B60T 1/00* | (2006.01) |

(52) U.S. Cl.
CPC ............. *B62D 7/1509* (2013.01); *B60K 7/00* (2013.01); *B60T 1/005* (2013.01); *B62D 5/00* (2013.01); *B62D 7/1545* (2013.01); *B60K 2007/0038* (2013.01); *B60K 2007/0092* (2013.01)

(58) Field of Classification Search
CPC ...... B62D 7/1509; B62D 5/00; B62D 7/1545; B60K 7/00; B60K 2007/003; B60K 2007/009; B60T 1/005
USPC ............. 180/253, 402, 408, 411, 416, 419; 280/91.1, 93.502, 93.512, 99
See application file for complete search history.

(56) References Cited

U.S. PATENT DOCUMENTS

| | | | | |
|---|---|---|---|---|
| 5,040,649 | A * | 8/1991 | Okada | 192/220.1 |
| 5,482,125 | A * | 1/1996 | Pagett | 180/6.32 |
| 6,371,239 | B2 * | 4/2002 | Furumi et al. | 180/445 |
| 6,371,243 | B1 | 4/2002 | Donaldson et al. | |
| 7,278,511 | B1 | 10/2007 | Gass et al. | |
| 7,922,184 | B2 * | 4/2011 | Porcheron | 280/93.506 |
| 7,930,801 | B2 * | 4/2011 | Hilger | 16/32 |
| 8,590,855 | B2 * | 11/2013 | Carnevali | 248/479 |
| 8,919,464 | B2 * | 12/2014 | Greenwood et al. | 180/6.24 |
| 2004/0129491 | A1 | 7/2004 | Bean et al. | |
| 2008/0184687 | A1 * | 8/2008 | Scherbring et al. | 56/10.1 |
| 2008/0217119 | A1 * | 9/2008 | Ritchie et al. | 188/72.4 |
| 2015/0137471 | A1 * | 5/2015 | Smith et al. | 280/93.502 |

* cited by examiner

*Primary Examiner* — Jacob Knutson
(74) *Attorney, Agent, or Firm* — Mohr Intellectual Property Law Solutions, PC

(57) ABSTRACT

The present invention relates to a steering system that allows the user to switch between a first steering mode and a second steering mode by a purely mechanical means. This includes, but is not limited to, switching from an all-wheel steering mode to a crab steering mode. The four wheel steering interchange system includes a chassis, a front wheel steering system, a rear wheel steering system, and a steering control link that connects the front wheel steering system and the rear wheel steering system. The four wheel steering interchange system also includes a steering interchange that mechanically switches the steer of the attached vehicle from one mode to a second mode.

13 Claims, 10 Drawing Sheets

STEERING APPARATUS WITH MULTI-STEERING MODES

BACKGROUND

The present disclosure relates generally to steering interchange systems in vehicles. In particular, steering systems where the vehicle switches from an all-wheel mode of steering to a second crabbing mode of steering through mechanical means are described.

Known steering interchange systems are not entirely satisfactory for the range of applications in which they are employed. For example, existing steering systems tend to be complex and require specialized components such as microprocessors, sensors, and complex electronic circuitry. In addition, not only are conventional steering systems more complex, but also more costly.

Thus, there exists a need for steering systems that are less complex and costly than the design of known steering mode changers/shifters. Examples of new and useful steering systems relevant to the needs existing in the field are discussed below.

Examples of references relevant to steering interchange system include U.S. Patent References: U.S. Pat. No. 6,371,243 to Donaldson ("Donaldson"), U.S. Pat. No. 7,278,511 to Gass ("Gass"), and U.S. Patent Application 20040129491 to Bean ("Bean"). The complete disclosures of the above patents and patent applications are herein incorporated by reference for all purposes.

Donaldson discloses a mobile personal lift that allows the operator to switch between different modes of steering. The Donaldson lift include directional switches and steering mode selectors that are coupled to a microprocessor that operatively coupled to hydraulic cylinders located at each wheel. The microprocessor controls the hydraulic cylinders corresponding to each wheel to the selected steering mode and corresponding movement of the joystick. Sensors positioned adjacent to each wheel and connected to the microprocessor measure the angular position of each wheel relative to the longitudinal axis of the chassis. The information from the sensors is then transmitted to the microprocessor and used to synchronize the wheels.

Gass also discloses a mechanism for switching between different modes of steering. Gass discloses one or more actuators for selectively steering wheels of the vehicle. Gass discloses an electronic control unit that provides control signal to one or more rear wheels. When the vehicle operator determines a particular steering mode is appropriate for the present riding conditions, an input device may be used to produce an input signal. A vehicle in accordance with the present invention, may also comprise an electronic control unit (ECU) coupled to a plurality of sensors. The ECU may compare a first riding parameter to a second riding parameter in order to determine whether operation in a second steering mode is appropriate, in light of present riding conditions. The ECU may produce an enabling signal when the ECU determines that operation in the second steering mode is appropriate for the present riding conditions.

Bean also describes a vehicle operable in a plurality of steering modes including two wheel steering, crab steer, and coordinated steer. A wheel angle sensor is disposed in coordination with each wheel. The Bean vehicle also includes a hydraulic cylinder coupled with extendable and retractable axles. The hydraulic cylinders may be controlled to effect extension and retraction of the axles only when the vehicle is traveling above a predetermined minimum speed. Four digital or analog switches are coupled with the axles indicating when the axles are fully extended. The drive and steering functions are controlled according to signals from the switches.

SUMMARY

The present disclosure is directed to a steering system that allows the user to switch between a first steering mode and a second steering mode by a purely mechanical means. This includes, but is not limited to, switching from an all-wheel steering mode to a crab steering mode. The four wheel steering interchange system includes a chassis, a front wheel steering system, a rear wheel steering system, a steering control link steering mode interchanger that connects the front wheel steering system and the rear wheel steering system. The front wheel steering system includes a front steering system crossbar that links a front left and right wheel bracket while a rear steering system crossbar links rear-left and rear-right wheel brackets. The four-wheel steering interchange system also includes a steering interchanger that mechanically switches the steer of the attached vehicle from one mode to a second mode.

DETAILED DESCRIPTION

Figure 1A:
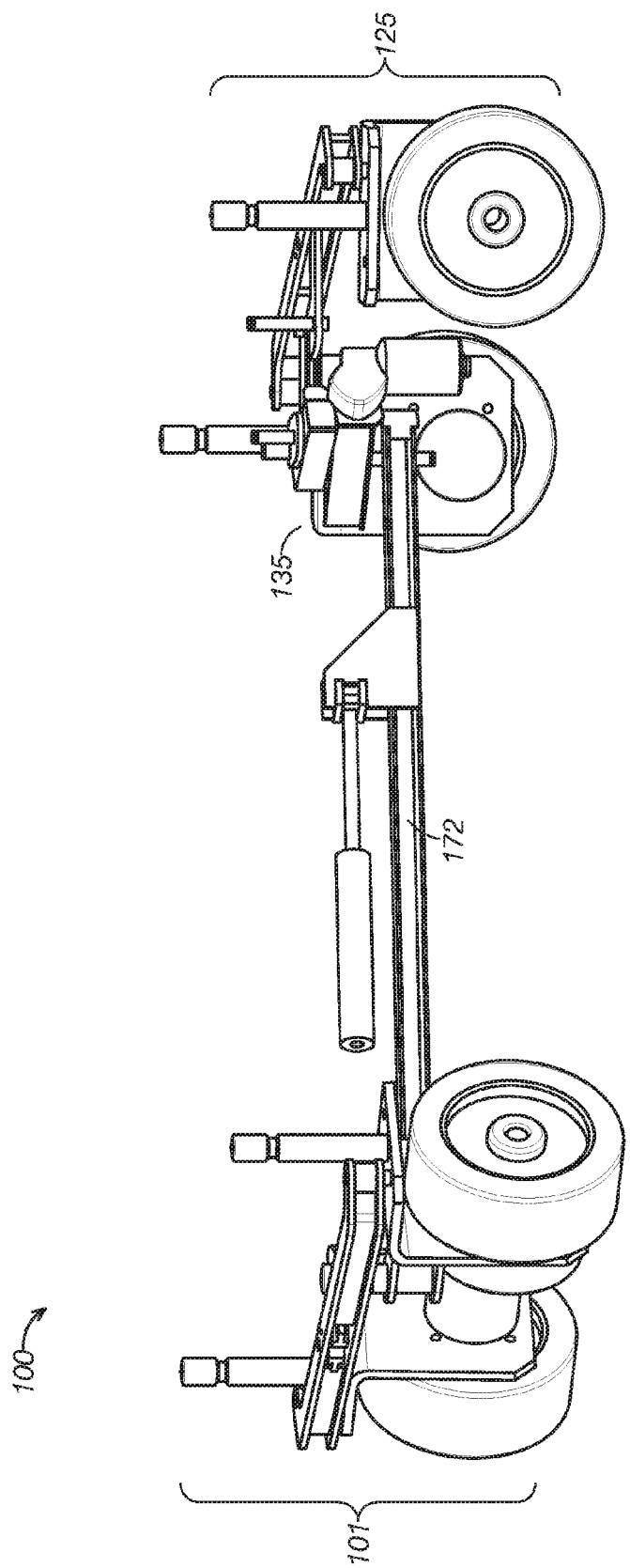
FIG. 1A is an offset profile view of a steering mode interchange system according to one embodiment of the present invention.
Figure 1B:
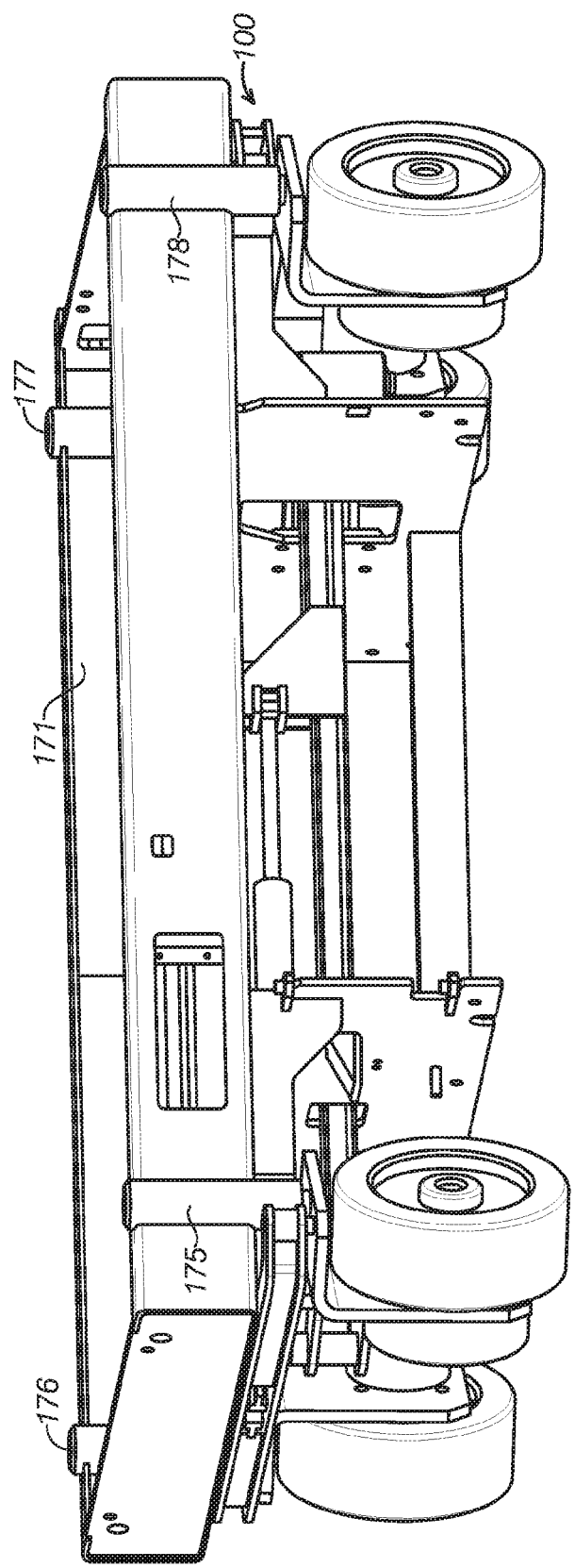
FIG. 1B is an offset profile view of the steering mode interchange system of FIG. 1A coupled to a chassis.

The disclosed steering mode interchange system will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations;

however, for the sake of brevity, each and every contemplated variation is not individually described in the following detailed description.

Throughout the following detailed description, examples of various steering mode interchange system are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The present disclosure relates to a mechanical system that switches the steering from one steering mode to a second steering mode, such as from an all-wheel steering mode to a crab steering mode. Because the steering mode interchange system is purely a mechanical system, there is no need for sensors, microprocessors, or expensive electronic circuitry. The absence of sensors, microprocessors, and expensive electronic circuitry allows the steering mode interchange system to be built at a lower cost using simpler and less costly components and is, therefore, more reliable, more robust, and easier to repair.

The disclosed steering mode interchange system is a mechanical mechanism that allows a mobile equipment (i.e. a vehicle) to switch among a number of steering modes, such as all—wheel steering, crab steering, or front wheel steering. Accordingly, both the front wheel brackets pivot with respect to a front wheel crossbar so that both front wheels turn in the same direction. All the rear wheel brackets are able to pivot with respect to the rear wheel crossbar such that all the rear wheels can turn to the same direction. The front wheels turn when the steering control link moves forwards or backwards. The steering control link is powered by a steering cylinder or motor. Corresponding to the movement of the front wheels, the rear wheels steering mode interchange controls the rear wheels to turn in either the opposite, keeping straight, or in the same direction as the front wheels. In the all-wheel steering mode, the rear wheels turn in the same angle degree as the front wheels but in the opposite direction. In the all-steering mode, a vehicle is able to turn with a small radius in limited spaces during movement. In a crab steering mode, when the front wheels are steered, the rear wheels also turn in the same direction as the front wheels. The crab steering mode allows a vehicle to get into a space with straight movement and no turning action.

The steering mode interchange system includes a series of limit switches that once the operators select the preferred steering mode, these switches allow the automatic transfer from one steering mode, such as all-wheel steering to a second steering mode, a crab steering. Additionally, the steering mode interchange system is coupled to a chassis.

With reference to FIG. 1A, a first preferred embodiment of the present invention consisting of a steering mode interchange system, system 100, will now be described. System 100 includes a front steering system 101, a rear steering system 125, a steering mode interchanger 135, and a steering control link 172. In addition, steering interchange system 100 includes a chassis 171 in connection with front steering system 101, rear steering system 125, and steering mode interchanger 135.

Steering Control Link

As shown in FIG. 1A, steering control link 172 connects front steering system 101 to rear steering system 125 through steering mode interchanger 135.

Figure 2:
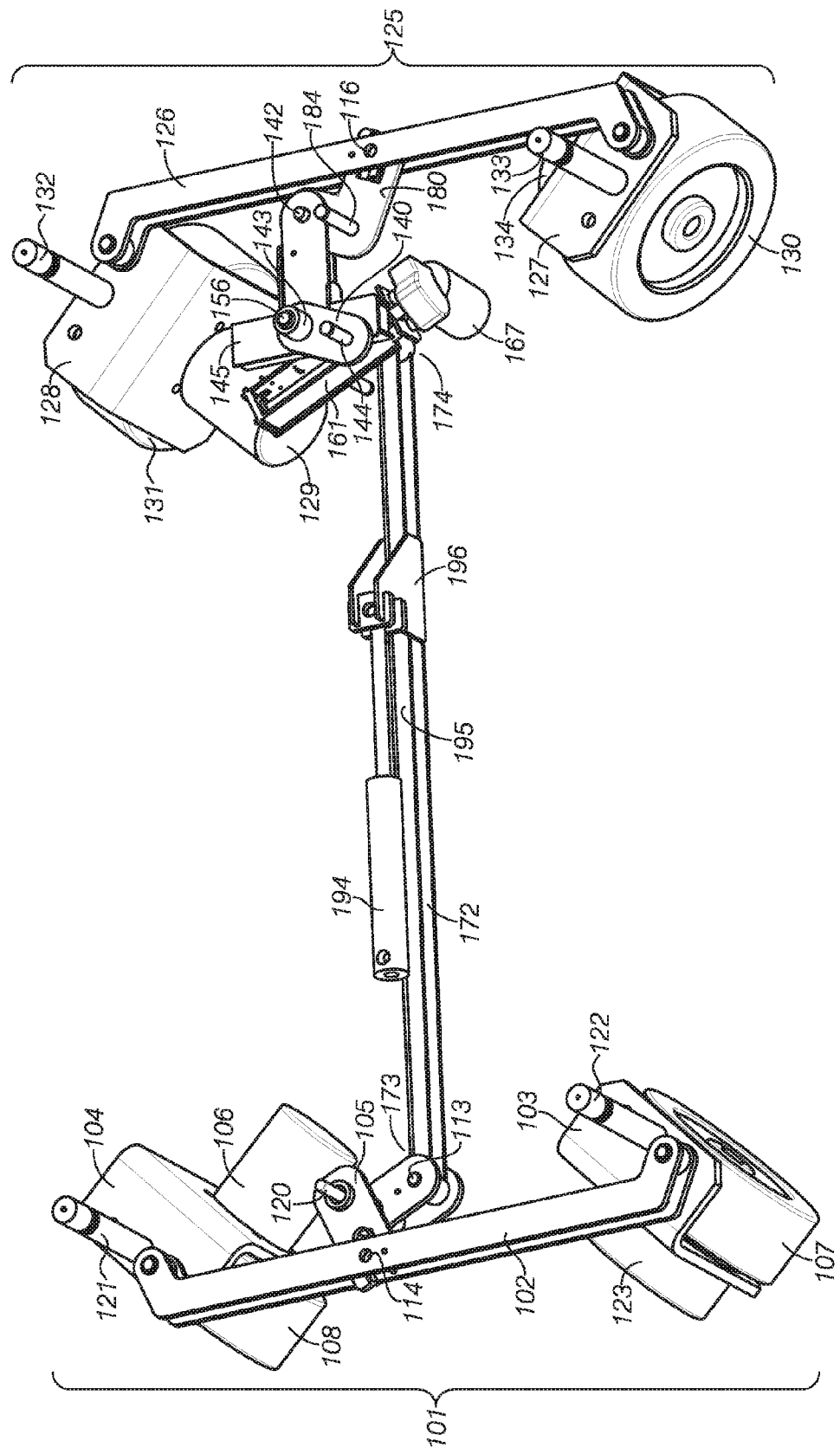
FIG. 2 is an offset top view of the steering mode interchange of FIG. 1.
Figure 3:
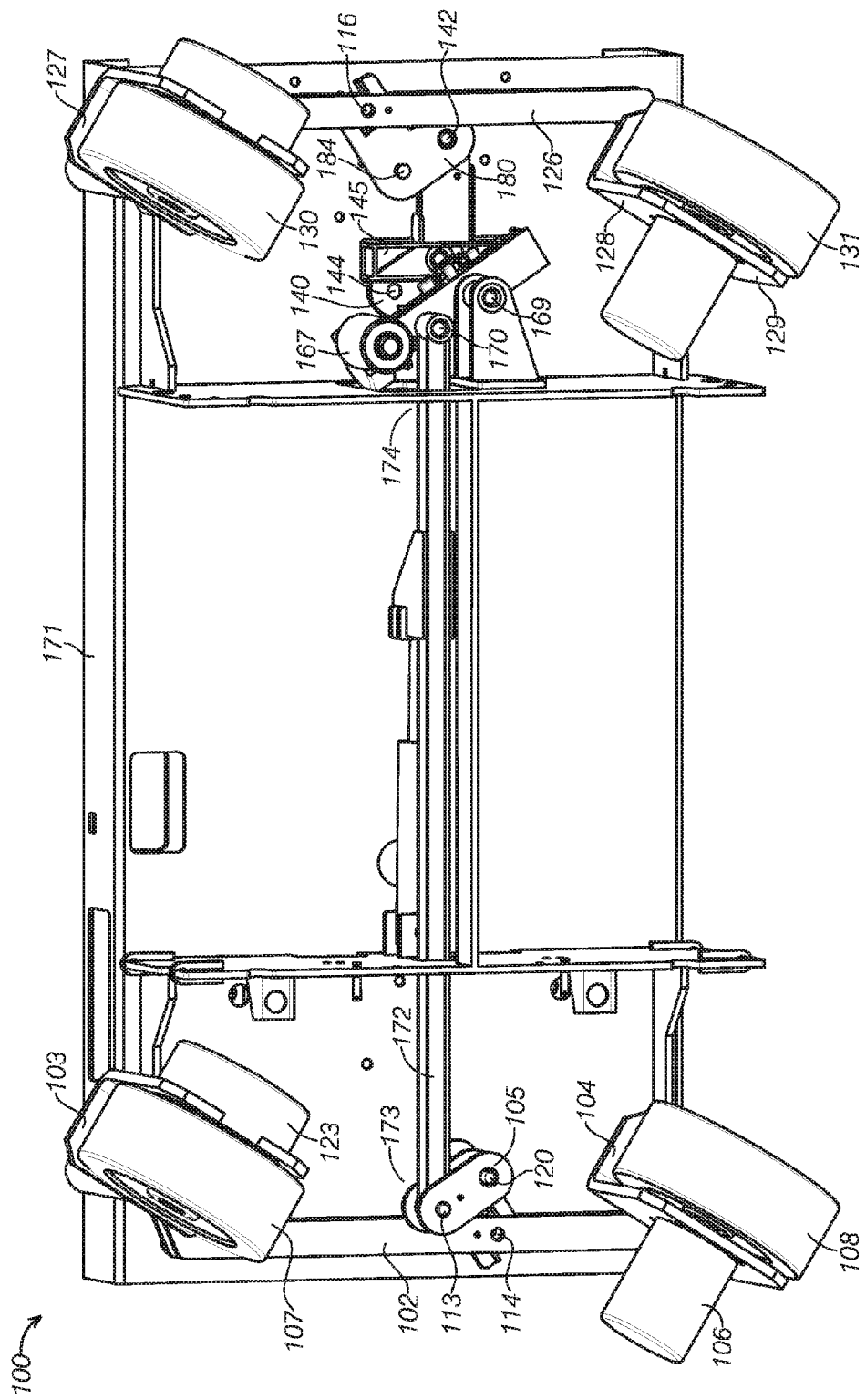
FIG. 3 is a bottom view of the steering mode interchange system of FIG. 1.

As shown in FIG. 2, steering control link 172 includes a steering control link front end 173 and a steering control link rear end 174. Steering control link front end 173 couples to front steering system 101 through front L-shaped pivot arm 105 and steering control link rear end 174 couples to steering mode interchanger 135 and rear steering system 125 through a bottom rail 161. Further disposed on steering control link 172 is a steering cylinder 194. Steering cylinder 194 provides power for steering the front and rear wheels. Steering cylinder 194 shifts steering control link 172 forward or backward along the longitudinal direction of steering control link 172 and thereby concertedly turning front L-shaped pivot arm 105 and front wheels 107/108. It also turns rear wheels 130/131 through its connection with steering mode interchanger 135 that is coupled to rear steering system 125. Rear steering system 125 and steering mode interchanger 135 will be discussed in greater detail below.

The steering control link 172 comprises a longitudinally arranged beam member 195 having a shaped cross section or tube made from steel or other metal alloy. This beam member 195 includes a first tube end 173 that couples to the front steering system 101 and a second tube end 174 that couples to the rear bottom rail 161 of steering mode interchanger 135. A bracket 196 arranges at an intermediate position and is coupled to beam member 195. Bracket 196 is further coupled to the actuating end of cylinder 194 whereby linear actuation of the cylinder results in synchronized linear movement of the bracket, which, in turn, causes beam member 195 to move linearly back and forth. This movement drives directly the front wheels 107 and 108 to turn and also drives the rear wheels to turn through the components of steering mode interchanger 135. While not shown in the figures, in use, steering cylinder 194 is connected to a pump that is normally fitted onto the engine or motor of the vehicle and, thus, are not discussed; however those having ordinary skill in the art will appreciate how such a pump would operate and relate to the present invention.

In actual operation, steering cylinder 194 and thus the steering control link 172 are controlled by the steering wheel or steering button operated by the operator. There is another separate steering mode selection button that an operator can push to select the steering mode, such as "All-Wheel Steering" or "Crab Steering" respectively.

Front Steering System

As shown in FIG. 2, front steering system 101 includes a front left wheel bracket 103, a front right wheel bracket 104, connected by a front crossbar 102. Front left wheel bracket 103 is coupled to at least one front left wheel 107 and front right wheel bracket 104 is coupled to at least one front right wheel 108. When steering control link 172 moves back and forth, front left wheel 107 and front right wheel 108 turn in response. Front crossbar 102 is pivoted with respect to front left wheel bracket 103 and front right wheel bracket 104 so that front right wheel 108 and front left wheel 107 are always turned to the same direction during steering. The top end of front left wheel bracket 103 includes a bracket pivot pin 122 and the top end of the front right wheel bracket 104 includes a bracket pivot pin 121. These 2 pivot pins are inserted into the mating tube 175 and 176 on the chassis 171 accordingly to connect the front steering system 101 to the chassis.

Further disposed on front right wheel bracket 104 is a front wheel drive motor 106. Front wheel drive motor 106 powers front right wheel 108 when a corresponding vehicle is in use. Further disposed on the front left wheel bracket 103 is the front wheel parking brake 123. So at any time, either the drive motor 106 or parking brake 123 is engaged so vehicles are either in driving condition or parking brake condition.

Figure 9A:
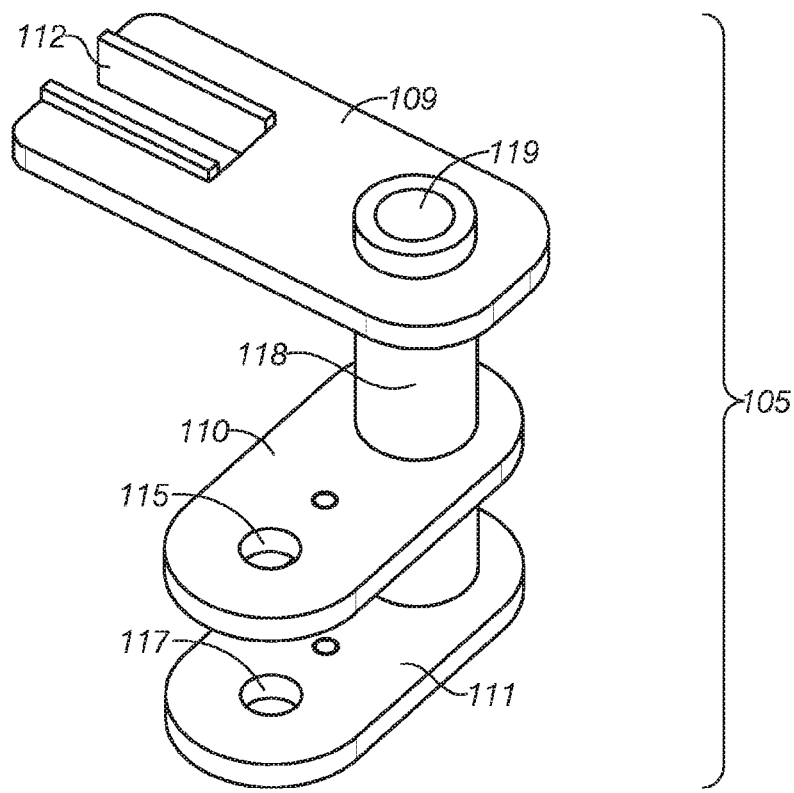
FIG. 9A is a perspective view of a front L-shaped pivot arm of the steering mode interchange system of FIG. 1.

Front steering system 101 further includes a front L-shaped pivot arm 105, as shown in FIG. 9A. This L-shaped pivot arm 105 includes a top plate 109, a middle plate 110, and a bottom plate 111. They are connected together by a vertical tube 118 having a hole 119 disposed throughout. The top plate 109 further includes a front groove 112. This front groove 112 couples with middle pin 114 of front wheel crossbar 102 such that when L-shaped pivot arm 105 is turned by steering control link 172, crossbar 102 will move in the cross direction and thus push the front wheel brackets/wheels to turn.

Front L-shaped pivot arm middle plate 110 and front L-shaped pivot arm bottom plate 111 are parallel to each other but they are all perpendicular to the top plate 109 in horizontal direction. These three plates are connected by a common tube 118 which go through each of the plate. As shown in FIG. 2, a connecting pin 120 goes through tube 118 and pivots front L-shaped pivot arm 105 to chassis 171.

Front L-shaped pivot arm middle plate 110 has a hole 115 which is concentric to a second hole 117 on front L-shaped pivot arm bottom plate 111. Steering control link front end 173 fits within space between front L-shaped pivot arm middle plate 110 and front L-shaped pivot arm bottom plate 111. As shown in FIG. 2, a connecting pin 113 goes through hole 115 and hole 117, and also front tube end 173 so when control link 172 shifts forward and backward, it pushes front L-shaped pivot arm 105 to swing, which in turn causes the front wheel crossbar 102 to push the front wheels to turn.

Rear Steering System

As shown in FIG. 2, rear steering system 125 includes a rear crossbar 126, a rear left wheel bracket 127, a rear right wheel bracket 128, a rear left wheel 130, a rear right wheel 131, a drive motor 129 and a parking brake 134. Rear crossbar 126 connects rear left wheel bracket 127 with rear right wheel bracket 128 and the rear L-shaped pivot arm 180. Rear left wheel 130, coupled with parking brake 134 is disposed on the underside of rear left wheel bracket 127 and rear right wheel 131, coupled with drive motor 129, is disposed on the underside of rear right wheel bracket 128. Further, disposed on the top of rear left wheel bracket 127 and on the top of rear right wheel bracket 128 are a rear left wheel bracket pivot pin 133 and a rear right wheel bracket pivot pin 132. Rear right wheel bracket pivot pin 132 and rear left wheel bracket pivot pin 133 are inserted and mated to a first tube 177 and a second tube 178 on the chassis 171 accordingly allowing the rear steering system 125 to be connected to the chassis 171. The rear wheel drive motor and the front wheel drive motor are always mounted on the same side of the vehicle, with the rear parking brake and front parking brake are mounted on the other side of the vehicle. In other examples, the parking brakes can be disposed on the right wheel brackets and the drive motors can be disposed on the left wheel brackets.

Similar to front steering system 101, rear steering system 125 includes a rear L-shaped pivot arm 180. Unlike front steering system 101, steering mode interchanger 135 is disposed between rear steering system 125 and steering control link 172. Also, unlike front L-shaped pivot arm 105 in front steering system 101, rear L-shaped pivot arm 180 has a different structure as shown in FIG. 9B.

Figure 9B:
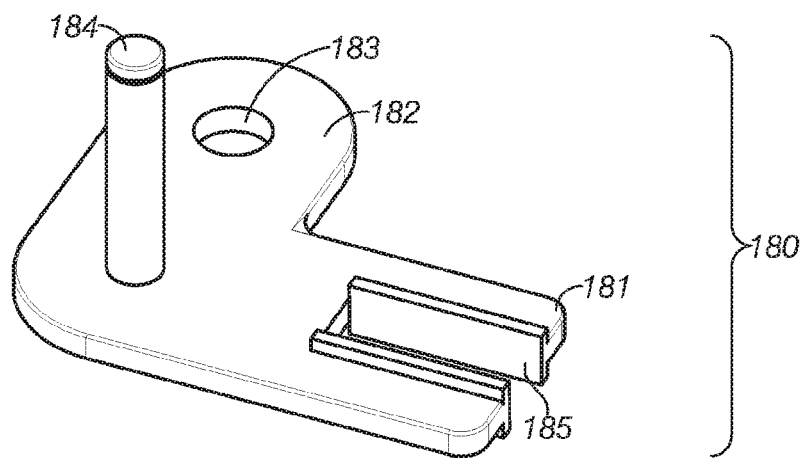
FIG. 9B is a perspective view of a rear L-shaped pivot arm of the steering mode interchange system of FIG. 1.

As shown in FIG. 9B, rear L-shaped pivot arm 180 as the name suggests is generally a L-shaped piece of plate, most preferably metal or metal alloy. Rear L-shaped pivot arm 180 includes a rear L-shaped pivot arm open end 181 and the other close end 182 that is perpendicularly to the open end 181. At the rear L-shaped pivot arm open end 181, there is a rear L-shaped pivot arm groove 185. This rear L-shaped pivot arm groove 185 couples with a pin 116 that goes through rear crossbar 126 at an intermediate position as shown in FIG. 2. Rear L-shaped pivot arm end 182 further includes an aperture 183. This aperture 183 couples the rear L-shaped pivot arm 180 to a T-shaped top rail 145 by pin 142 as shown in FIG. 2. At the intersection of rear L-shaped pivot arm open end 181 and rear L-shaped pivot arm closed end 182 is a rear L-shaped pivot arm pin 184. This pin 184 couples to a mating tube on chassis 171 and thus pivots rear L-shaped pivot arm 180 to chassis 171. Rear L-shaped pivot arm 180 forces rear crossbar 126 to move in a cross direction through their coupling point and cross movement of rear crossbar 126 pushes the rear brackets/wheels to turn during steering. Since the rear brackets are all pivoted by rear crossbar 126, so all rear wheels will turn to the same direction during steering.

Steering Mode Interchanger

As shown in FIG. 2, steering mode interchanger 135 includes a top rail arm 140, T-shaped top rail 145, a bottom rail 161, and a sliding block 157. Steering mode interchanger 135 is disposed between steering control link 172 and rear steering system 125. Steering mode interchanger 135 couples steering control link 172 through bottom rail 161, and couples rear steering system 125 through T-shaped top rail 145 and rear L-shaped pivot arm 180. Steering mode interchanger 135 controls rear left wheel 130 and rear right wheel 131 to turn in the opposite direction (All Wheel Steering mode), or in the same direction (Crab Steering mode), or have no turn (Front Wheel Steering mode) relative to the front wheel 107/108's turning directions based on which steering mode is selected by the operator.

Figure 8:
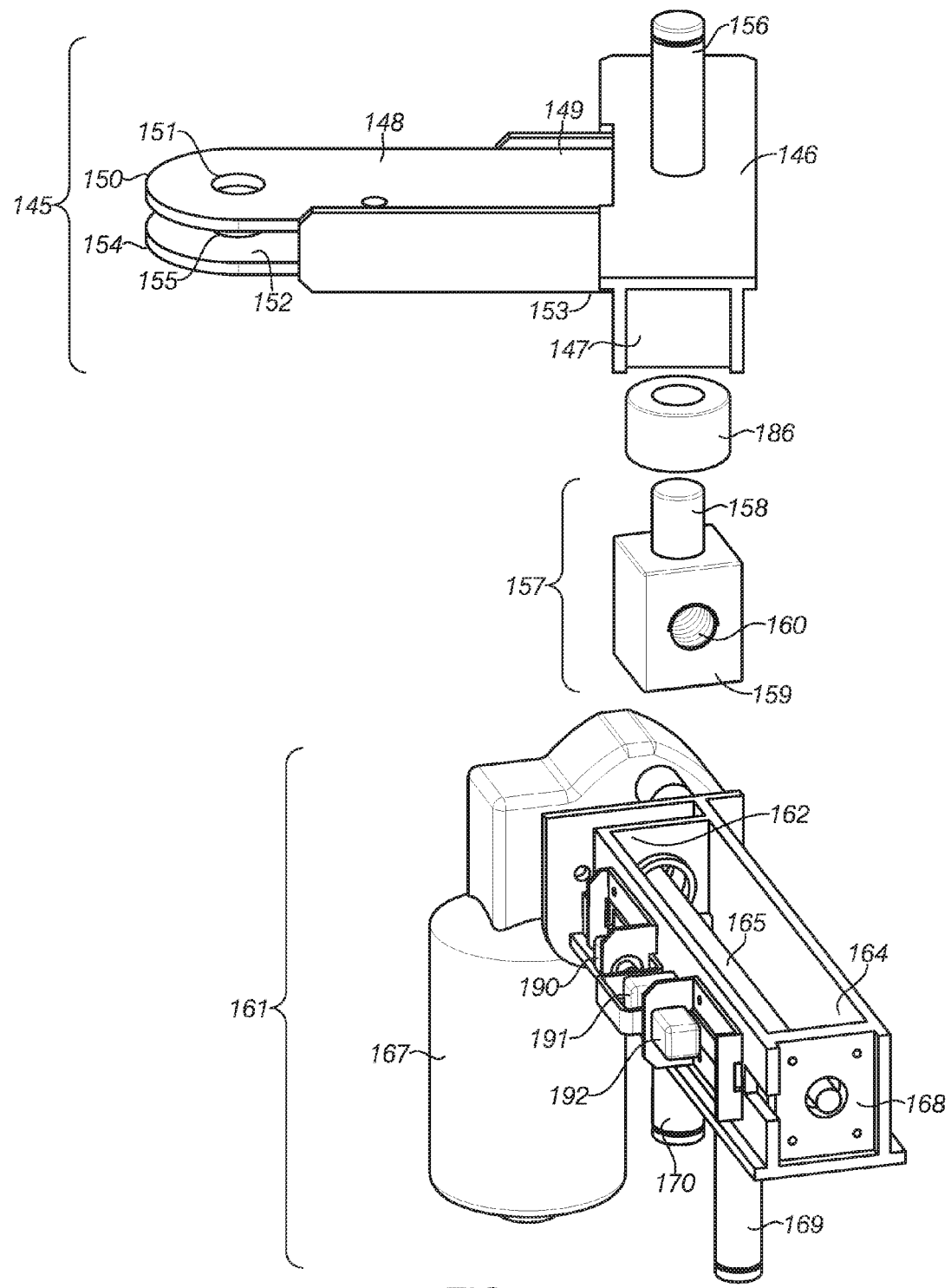
FIG. 8 is an exploded frontal view of some components of a mechanical steering mode interchanger of the steering mode interchange system according to one embodiment of the present invention.

As shown in FIG. 2 and FIG. 8, on top of steering mode interchanger 135 is T-shaped top rail 145. T-shaped top rail 145, as the name suggests, is in the shape of the letter "T". T-shaped top rail 145 includes a shorter T-shaped top rail cross bar 146 that corresponds to the short length of the "T". T-shaped top rail cross bar 146 is essentially rectangular cube in shape and is open on its underside and has the interior space with its width the same as its end plate 147 width and the outside the diameter of the sliding block's top bushing 186.

As shown in FIG. 8, the longer stem of the "T" of T-shaped top rail 145 includes a T-shaped top rail top plate 148 and a T-shaped top rail bottom plate 152. T-shaped top rail top plate 148 and a T-shaped top rail bottom plate 152 are positioned parallel to each other at a pre-determined distances. T-shaped top rail top plate 148 further includes a T-shaped top rail top plate first end 149 and a T-shaped top rail top plate second end 150, while T-shaped top rail bottom plate 152 includes a T-shaped top rail bottom plate first end 153 and a T-shaped top rail bottom plate second end 154. T-shaped top rail top plate first end 149 and T-shaped top rail bottom plate first end 153 are fixed to T-shaped top rail cross bar 146. T-shaped top rail top plate second end 150 include an aperture 151 and T-shaped top rail bottom plate second end 154 include an aperture 155. T-shaped top rail top plate aperture 151 and T-shaped top rail bottom plate aperture 155 are concentric to each other.

Figure 4A:
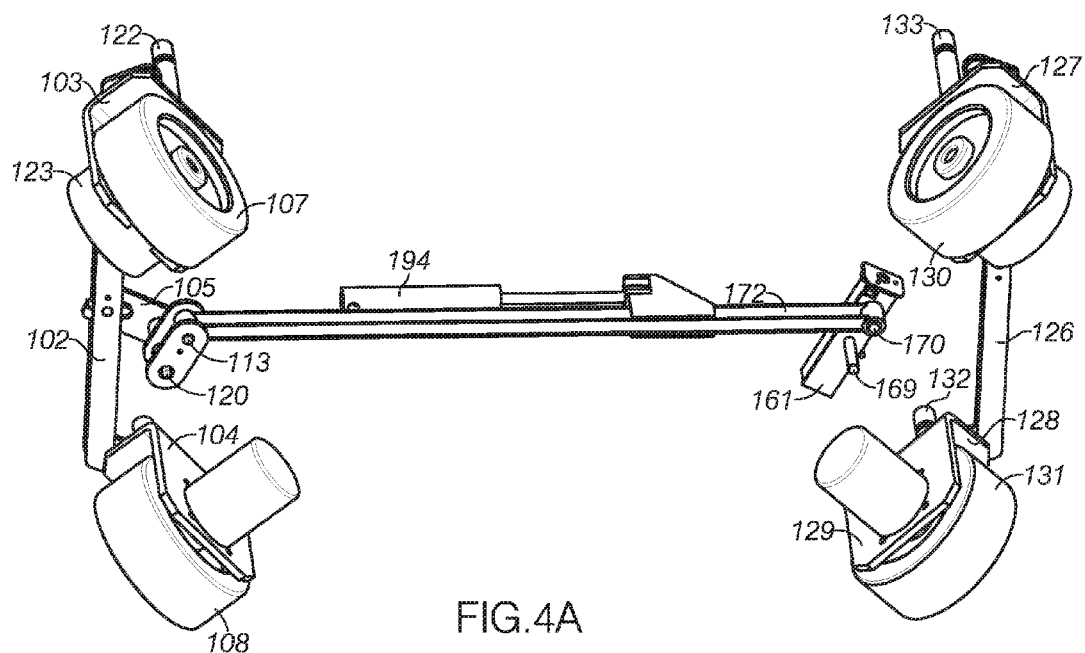
FIG. 4A is a partially exploded view of parallelogram related to the front wheel steering system.
Figure 4B:
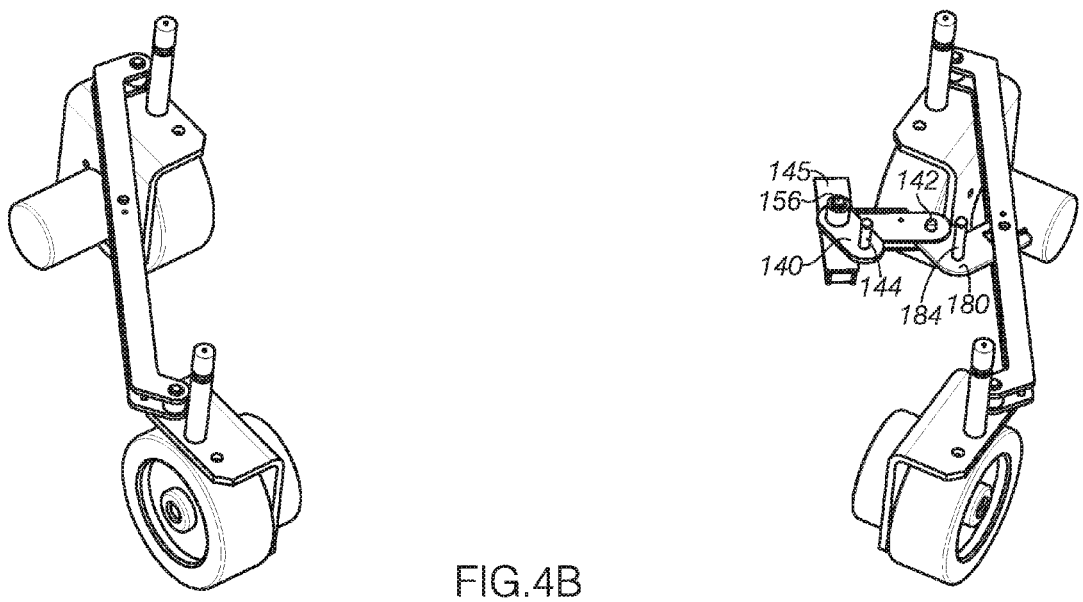
FIG. 4B is a partially exploded view of parallelogram related to the rear wheel steering system.

As shown in FIG. 2 and FIG. 4B, top rail 145, top rail arm 140, rear L-shaped pivot arm 180 and chassis 171 are concertedly pivoted in a way that top rail 145 can only make parallel movements with respect to a top rail arm chassis pin 144 and a rear L-shaped arm pin 184 to pivot a top rail arm 140 and a rear L-shaped pivot arm 180 to chassis 171, and with T-shaped top rail pin 156 and a top rail arm pin 142 to pivot top rail arm 140 and rear L-shaped pivot arm 180 to the top rail 145 accordingly. Both top rail arm 140 and rear L-shaped pivot arm 180 act as the swing arms with the same arm length and also the plane containing top rail arm chassis pin 144 and top rail arm pin 156 is parallel to the plane containing a rear L-shaped arm pin 142 and a rear L-shaped arm chassis pin 184, so top rail 145 can only make the parallel movement.

Next as shown in FIG. 8, steering mode interchanger 135 includes sliding block 157. Sliding block 157 is composed of a sliding block top interface 158 and a sliding block bottom interface 159. Sliding block top interface 158 is cylindrical in shape and sits on top of sliding block bottom interface 159. Sliding block bottom interface 159 is in cuboid shape that slides but does not rotate inside the open space 164 of the bottom rail 161. Further included on sliding block bottom interface 159 is a thread aperture 160. Sliding block top cylindrical interface 158 is fitted to the internal wall of round bushing 186. The outside wall of round bushing 186 fits into the interior space of the T-shaped top rail 145.

As shown in FIG. 8, bottom rail 161 includes a bottom rail motor end plate 162 and a bottom rail free end plate 168. Bottom rail 161 is essentially a rectangular cube with a bottom rail interior space 164 that fits with the sliding block bottom interface 159 profile. Inside bottom rail interior space 164 is a screw shaft 165 that is disposed at the center of bottom rail interior space 164 and attached to the bottom rail motor end plate 162 and bottom rail free end plate 168 of bottom rail 161. Screw shaft 165 fits with sliding block bottom interface 159's screw aperture 160 and thus when screw shaft 165 rotate, it forces the sliding block 157 to travel longitudinally inside the space 164. Moving sliding block 157 from bottom rail motor end plate 162 side to bottom rail free end plate 168 side, or vice versa, will change the relative steering direction of rear wheel 130/131 to front wheels 107/108 and thus will change the steering of the corresponding vehicle from one steering mode to other steering mode, such as from an all-wheel steering to a crabbing traveling. Screw shaft 165 is coupled to a motor 167 which provides the power to screw shaft 165 and its action is controlled by the steering mode selection button.

As shown in FIG. 2 and FIG. 4A, the L-shape front pivot arm 105, bottom rail 161, control link 172 and chassis 171 concertedly pivot in a way that steering control link 172 can only make parallel movements with pin 120 and pin 169 being the pivot points for front L-shaped pivot arm 105 and bottom rail 161 to chassis 171 at one end, and with pin 113 and pin 170 as the pivot points for front L-shaped pivot arm 105 and bottom rail 161 to steering control link 172 on the opposite end. Further, as shown in FIG. 4A, front L-shaped pivot arm 105 and bottom rail 161 act as the swing arms with the same swing arm length and also front L-shaped arm middle plate 110 and front L-shaped arm bottom plate 111 are parallel to bottom rail 161, so steering control link 172 can only make back and forth parallel movements. The parallel motions of steering control link 172 interact with the parallel motions of T-shaped top rail 145 through sliding block 157 where T-shaped top rail 145 and steering control link 172 have the same swing arm length such that steering control link 172 and T-shaped top rail 145 are always parallel to each other.

As shown in FIG. 8, further included on bottom rail 161 is a series of three limit switches 190, 191 and 192 which represent 3 steering mode—"All Wheel Steering", "Front Wheel Steering" and "Crab Steering". These 3 limit switches automatically stop sliding block 157 at three positions that corresponds to an all-wheel steering mode, a front wheel steering mode, and a crab steering mode. Finally, on the underside of bottom rail 161 is a bottom rail chassis pin 169 and a bottom rail control link pin 170. Bottom rail chassis pin 169 fits and pivots within a corresponding aperture on chassis 171. Bottom rail control link pin 170 connects steering mode interchanger 135 through bottom rail 161 to steering control link rear end 174, as shown in FIG. 4A.

Steering Modes

Figure 5:
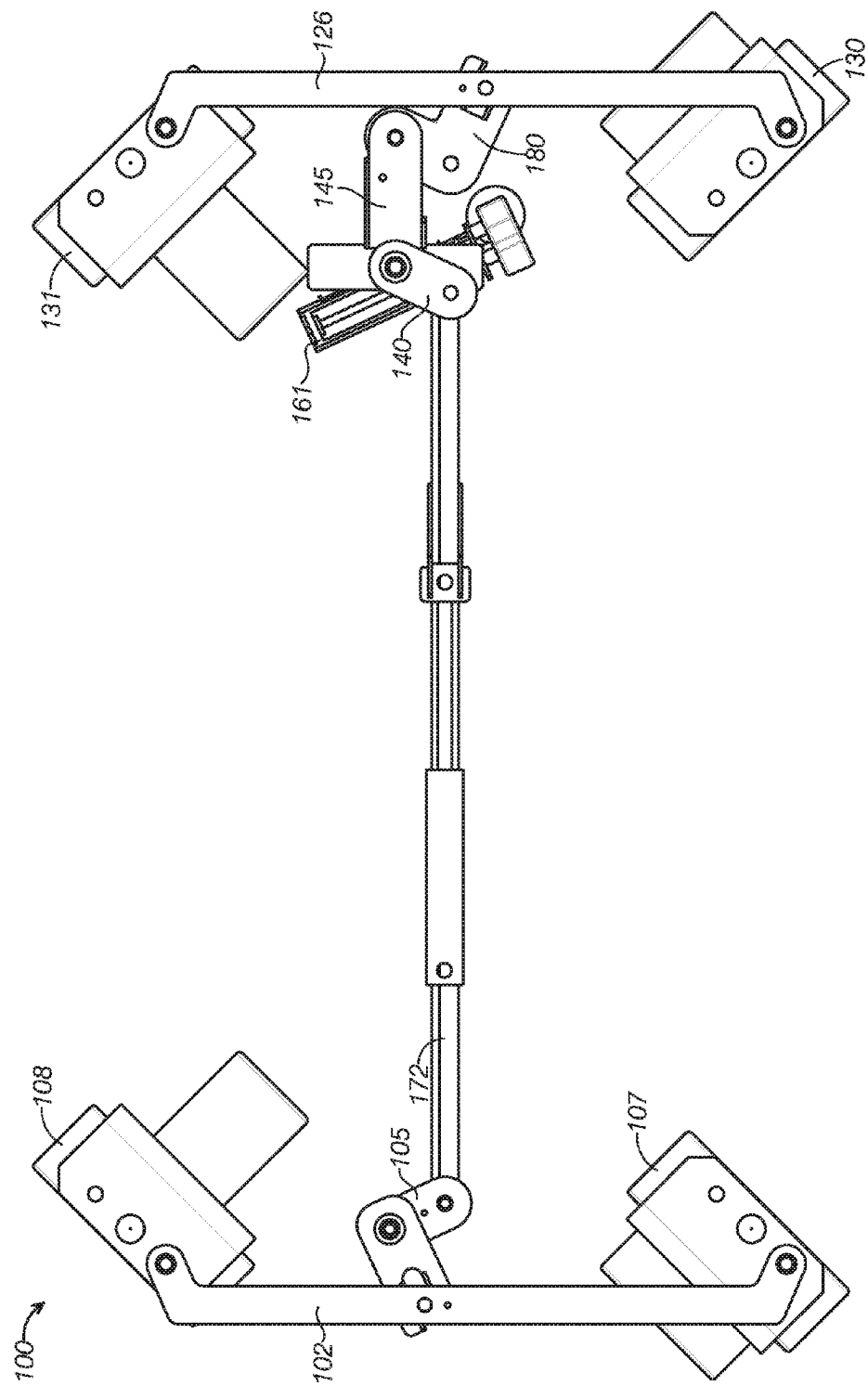
FIG. 5 is top view steer mode interchange system in an all-wheel steering mode according to one embodiment of the present invention.

A first available steering mode is all-wheel steering. In an all-wheel steering mode, sliding block 157 slides within bottom rail 161 and stops by limit switch 190 at a position just above the pivoting point of steering control link 172 and bottom rail 161 and thus is concentric to the pin 170. At this position, when steering control link 172 moves, it pushes the T-shaped top rail 145 to move in the same direction since they are connected by the sliding block 157 on the same side of bottom rail chassis pin 169. As shown in FIG. 5, following control link 172's movement, the rear wheels 130/131 will turn in the opposite direction of the front wheels 107/108 so the vehicles are in the "all wheel steering mode" during steering.

Figure 7:
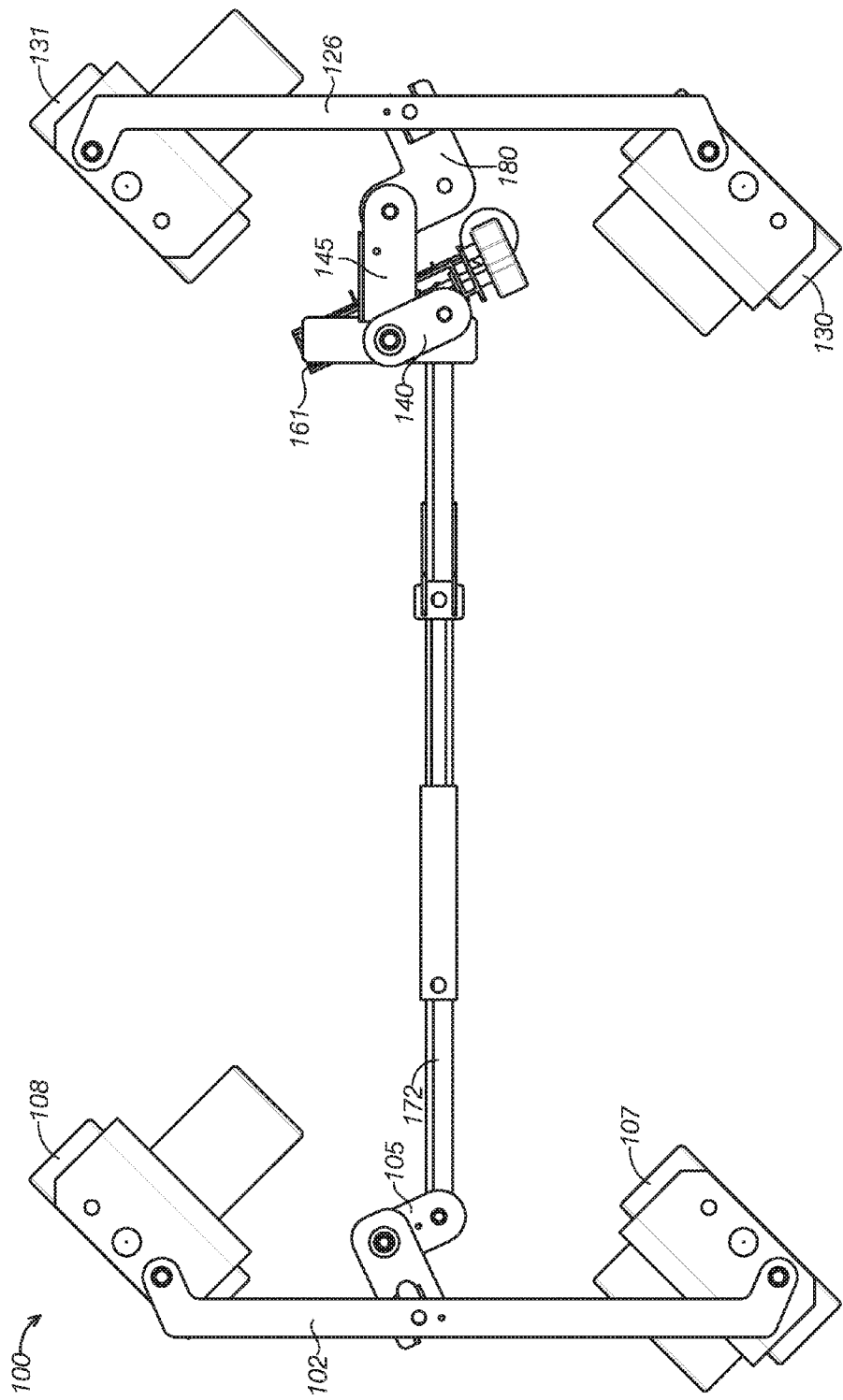
FIG. 7 is a top view the steer mode interchange system of FIG. 5 now showing it in a crab steering mode.

A second available steering mode is crab steering. When the steering mode changes from the above mentioned all-wheel steering mode to a crab steering mode, sliding block 157 slides within bottom rail 161, pass over a chassis pivot pin 169 location of bottom rail 161 and is stopped by the limit switch 192 at the exact opposite side of the pivoting point of steering control link 172 and bottom rail 161. As shown in FIG. 7, the chain reaction happens in below sequence: (1) sliding block 157 moves up (2) T-shaped top rail 145 is pushed to move forward (3) rear L-shaped pivot arm 180 turns counterclockwise (4) rear crossbar 126 moves upward (5) rear wheel brackets/wheels 127/128/130/131 turn counterclockwise and stop at the parallel direction to the front wheels. In this position, when control link 172 moves, T-shaped top rail 145 moves in the opposite direction to the control link 172 since they are on the opposite side of the bottom rail chassis pivot pin 169 and thus will maintain the status that the rear wheels 130/131 will be in the same steering direction as the front wheels 107/108.

Figure 6:
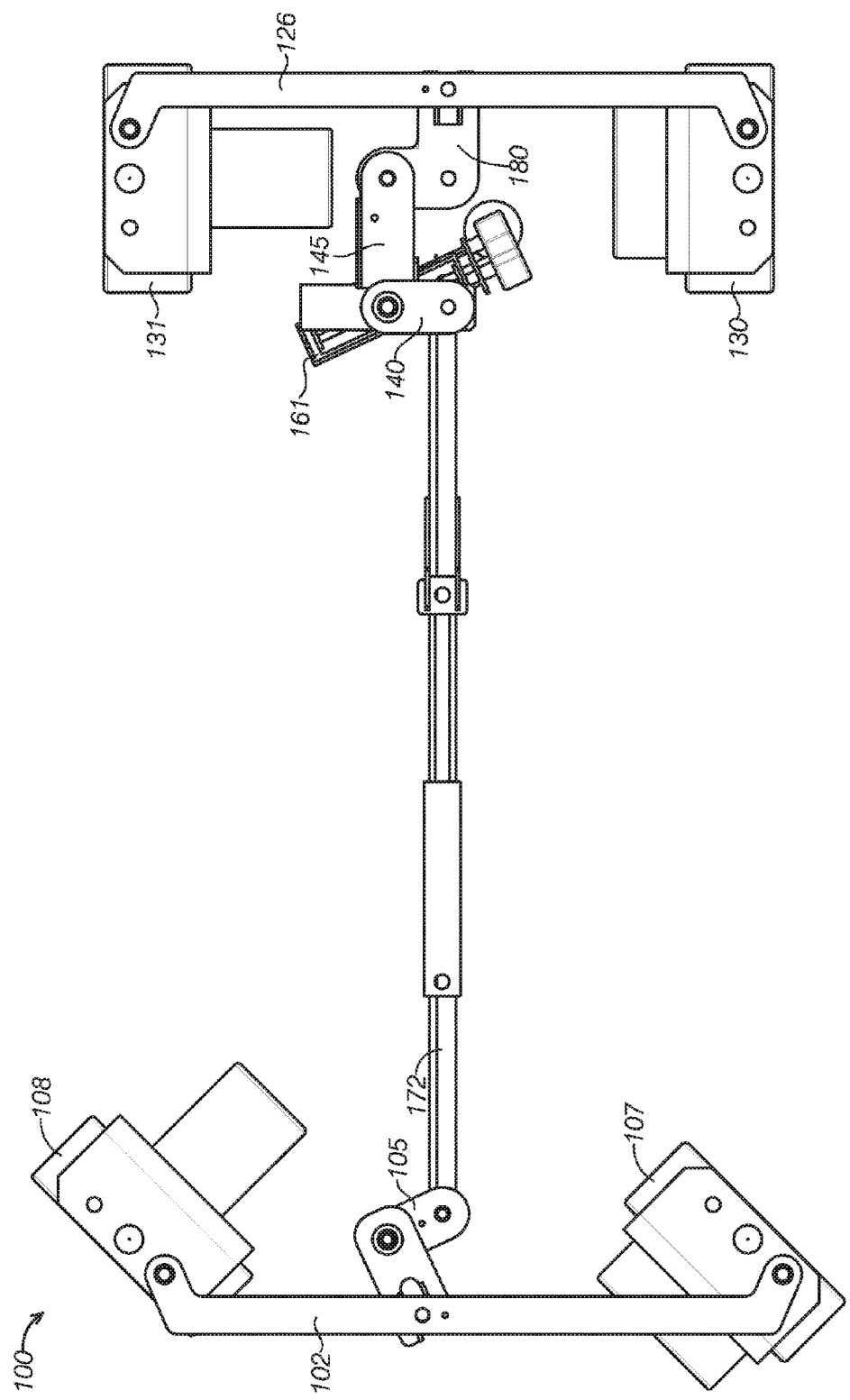
FIG. 6 is a top view of one embodiment of the steer mode interchange system showing it in a front-wheel steering mode.

Third available steering mode available is a front-wheel steering mode. In this mode, sliding block 157 slides within bottom rail 161 and is stopped by limit switch 191 just above the bottom rail chassis pivot pin 169. As shown in FIG. 6, with the same sequence as what happen to above mentioned crab steering mode, the rear wheels will make counterclockwise turn but will stop at the neutral position, which is parallel to the vehicle's longitudinal direction, when the sliding block 157 is stopped by limit switch 191 at the center location of the space 164 in the bottom rail 161. In this position, since the sliding block 157 is concentric to the bottom rail chassis pivot pin 169, so when control link 172 moves, the sliding block 157 has no travel at all but just rotates together with bottom rail 161, so the T-shaped top rail 145 has no movement at all and as the consequence, both the rear L-shaped pivot arm 180 and rear crossbar 126 have no movement when control link 172 moves, so the rear wheel 130/131 will stay in this neutral position when front wheels turns.

Finally, steering mode interchanger 135 can have different elements to move sliding block 157. Sliding block drive motor 167 can be a hydraulic cylinder, a hydraulic motor, and an electronic motor or actuator. Changing the front L-shaped pivot arm 105 and rear L-shaped pivot arm 180 relative orientation (face off or to the same direction) can also reverse sliding block 157's "All Wheel Steering" and "Crabbing Travel" position. Also control link 172 is powered by cylinder 194, which can also be a motor or line actuator.

The disclosure above encompasses multiple distinct inventions with independent utility. While each of these inventions has been disclosed in a particular form, the specific embodiments disclosed and illustrated above are not to be considered in a limiting sense, as numerous variations are possible. The subject matter of the inventions includes all novel and non-obvious combinations and sub combinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and sub-combinations of the disclosed inventions that are believed to be novel and non-obvious. Inventions embodied in other combinations and sub combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A four-wheel steering interchange system for motor vehicles having a chassis, the steering interchange system comprising:
    a front wheel steering system configured to control a first turning movement of at least one front wheel;
    a rear wheel steering system configured to control a second turning movement of at least one rear wheel;
    a steering control link comprising a first end and oppositely-disposed second end, the steering control link first end coupled to the front wheel steering system and the steering control link second end coupled to the rear wheel steering system;
    a mechanical steering mode interchange disposed between the rear wheel steering system and the steering control link second end configured to mechanically switch the four-wheel steering system from one steering mode to another steering mode;
    wherein the front wheel steering system further comprises a front L-shaped pivot arm comprising a vertical tube and
    a front L-shaped pivot arm top plate wherein;
        the front L-shaped pivot arm top plate comprises a front L-shaped pivot arm top plate first end and a front L-shaped pivot arm top plate second end;
        a front L-shaped pivot arm top plate aperture disposed on the front L-shaped pivot arm top plate first end for accepting the front L-shaped pivot arm vertical tube;
        a front L-shaped pivot arm top plate groove disposed on the front L-shaped pivot arm top plate second end for interacting with a front wheel crossbar;
    a front L-shaped pivot arm middle plate wherein;
        the front L-shaped pivot arm middle plate comprises a front L-shaped pivot arm middle plate first end and a front L-shaped middle plate second end;
            a front L-shaped pivot arm middle plate first aperture disposed on the front L-shaped arm middle plate first end and fixed to the front L-shaped pivot arm vertical tube;
            a front L-shaped pivot arm middle plate second aperture disposed on the front L-shaped arm middle plate second end;
    a front L-shaped pivot arm bottom plate wherein;
        the front L-shaped pivot arm bottom plate comprises a front L-shaped pivot arm bottom plate first end and a front L-shaped pivot arm bottom plate second end;
        a front L-shaped pivot arm bottom plate first aperture disposed on the front L-shaped arm middle plate first end and fixed to the front L-shaped pivot arm vertical tube;
        a front L-shaped pivot arm bottom plate second aperture disposed on the front L-shaped arm bottom plate second end;
        the front L-shaped pivot arm bottom plate second aperture is concentric to and aligns with the front L-shaped pivot arm middle plate second aperture;
        the front L-shaped pivot arm bottom plate is parallel to the front L-shaped pivot arm middle plate; and
        the front L-shaped pivot arm vertical tube couples the front L-shaped pivot arm top plate, the front L-shaped pivot arm middle plate, and the front L-shaped pivot arm bottom plate together such that the front L-shaped pivot arm top plate always lies within a plane parallel to planes for the front L-shaped pivot arm middle plate and the front L-shaped pivot arm bottom plate and wherein a longitudinal axis of the L-shaped pivot arm top plate is perpendicular to longitudinal axes of both the L-shaped pivot arm middle plate and the L-shaped pivot arm bottom plate; and
    the front L-shaped pivot arm vertical tube connects the front L-shaped pivot arm top plate, front L-shaped pivot arm middle plate and the front L-shaped pivot arm bottom plate together such that the front L-shaped pivot arm faces the chassis.

2. The four-wheel steering system of claim 1, wherein the front L-shaped pivot arm further comprises:
    a front L-shaped pivot arm top plate groove couples with a first pin on the front wheel crossbar at an intermediate position of the front wheel crossbar;
    a second pin pivotally couples the front L-shaped pivot arm middle plate and the front L-shaped pivot arm bottom plate with the steering control link first end through the front L-shaped pivot arm middle plate second aperture and the L-shaped pivot arm bottom plate second aperture; and
    a third pin inserted into the front L-shaped pivot arm vertical tube for coupling and pivoting the front L-shaped pivot arm to the chassis.

3. The four-wheel steering system of claim 2, wherein the mechanical steering interchange further comprises a top rail arm wherein the top rail arm comprises a top rail arm first end with a top rail arm tube and a top rail arm second end with a top rail arm pin;
    the top rail arm tube disposed on the top rail arm first end;
        the top rail arm tube couples to a T-shaped top rail cross bar pin at an intermediate position on a T-shaped top rail cross bar;
    wherein the top rail arm tube is further coupled to the chassis; and
    with the top rail arm and a rear L-shaped pivot arm pivoted with respect to the chassis on one end and pivoted with respect to a T-shaped top rail another end, so the top rail arm and the rear L-shaped pivot arm act as swing arms for the T-shaped top rail with the same swing arm length and a plane passing through the top rail arm pin and the top rail arm tube being parallel to a plane containing a third rear L-shaped pivot arm pin and a rear L-shaped pivot arm chassis pin such that when the T-shaped top rail moves forward and backwards, the T-shaped top rail can only make parallel movements in relation to the steering control link.

4. The four-wheel steering system of claim 2, wherein the mechanical steering mode interchanger further comprising a sliding block fitted with a bushing coupled to a T-shaped top rail cross bar by slidingly fitting within the T-shaped top rail cross bar; and
 a T-shaped top rail cross bar pin disposed at an intermediate position on the T-shaped top rail cross bar that couples a top rail to a top rail arm.

5. The four-wheel steering system of claim 4, the sliding block further comprises:
 a sliding block bottom interface wherein the sliding block bottom interface being rectangular-shaped to fit inside a bottom rail;
 a sliding block bottom interface aperture disposed on the sliding block bottom interface;
 a screw-driven shaft, a drive motor, a cylinder or a chain coupled to the sliding block bottom interface for providing power for the sliding block to slide inside the bottom rail;
 a sliding block top interface wherein the sliding block top interface being essentially cylindrically-shaped to couple with the bushing;
  the sliding block top interface couples to a T-shaped top rail by fitting within a T-shaped top rail cross bar interior space through the bushing; and
  the sliding block bottom interface couples with the bottom rail while the sliding block top interface couples with the T-shaped top rail and aligns a movement of the steering control link and the movement of the T-shaped top rail such that the steering control link and the T-shaped top rail are always parallel to each other at any position.

6. The four-wheel steering system of claim 5, wherein the sliding block bushing further comprising;
 a sliding block bushing inner surface, wherein the sliding block bushing inner surface being fitted to the sliding block top interface and is able to rotate around the sliding block top interface; and
 a sliding block bushing outer surface being fitted within the T-shaped top rail cross bar interior space and being able to slide lengthwise along the T-shaped top rail cross bar.

7. The four-wheel steering system of claim 5, wherein the sliding block bottom interface aperture further comprises:
 sliding block bottom interface threads or a sliding block bottom interface pin that couples with the screw-driven shaft, the drive motor, the cylinder or the chain to provide the driving power for the sliding block to move from a bottom rail first end to a bottom rail second end along a bottom rail interior space when switching between the steering modes.

8. The four-wheel steering system of claim 5, wherein a first steering mode is an all-wheel steering mode, wherein:
 the sliding block slides inside the bottom rail and stops by a first limit switch at a position just above a pivot point of the steering control link and the bottom rail; and
 the screw-driven shaft, the drive motor, the cylinder or the chain powers the steering control link to make the parallel movement and drives the T-shaped top rail to move in a same direction and with a same distance through the sliding block such that the T-shaped top rail drives a rear L-shaped pivot arm and a rear wheel crossbar to react, whereby a rear left wheel and a rear right wheel of the at least one rear wheel to an opposite direction of a front left wheel and a front right wheel of the at least one front wheel.

9. The four-wheel steering system of claim 5, wherein a second steering mode is a front wheel steering mode wherein:
 the sliding block slides in the bottom rail to a middle position on the bottom rail above a pivoting position where the chassis pivots with respect to the bottom rail and is stopped at a pivoting position by a second limit switch; and
 when the sliding block stays at the middle position, the sliding block rotates together with the bottom rail but does not travel when the steering control link moves, such that a rear right wheel and a rear left wheel of the at least one rear wheel always stays longitudinally parallel to the directional position of an attached vehicle.

10. The four-wheel steering system of claim 5, wherein a third steering mode is a crab steering mode, wherein:
 the sliding block slides inside the bottom rail to the bottom rail second end and is stopped by a
 third limit switch at an opposite end of an all-wheel steering mode position, such that the sliding block stays at a third limit switch controlled position wherein the steering control link and the T-shaped top rail move in opposite direction with respect to each other with a same distance causing a relative direction of a rear left wheel and a rear right wheel of the at least one rear wheel to change opposite from a rear right wheel and a rear left wheel position when in the all-wheel steering mode; and
 the rear left wheel and the rear right wheel remain at a parallel position to a front left wheel and a front right wheel of the at lease one front wheel.

11. The four-wheel steering system of claim 1, wherein steering system further comprising a bottom rail, wherein the bottom rail comprises:
 a bottom rail center pin disposed at a planar center of the bottom rail pivoted with respect to the chassis and a bottom rail end pin disposed at on a first end of the bottom rail pivoted with respect to the steering control link;
 the front L-shaped arm middle plate and the front L-shaped arm bottom plate are parallel to the bottom rail; and
 the front L-shaped arm and the bottom rail act as swing arms for the steering control link and have a same length such that when the steering control link moves forward and backwards, the steering control link can only make parallel movements which interact with parallel movement of a T-shaped top rail.

12. The four-wheel steering system of claim 11, wherein the bottom rail further comprises:
 a bottom rail first end;
  the bottom rail first end supporting a screw-driven shaft, a drive motor, a cylinder, or a chain wherein the screw-driven shaft, the drive motor, the cylinder or the chain provide power for a sliding block to move;
 a bottom rail second end disposed opposite from the bottom rail first end;
 a bottom rail top side wherein the bottom rail top side being open and is coupled to a T-shaped top rail;
 a bottom rail bottom side;
 a bottom rail bottom side plate disposed at the bottom rail bottom side;
 a bottom rail right side;
 a bottom rail right side plate disposed at the bottom rail right side;
 a bottom rail left side;

a bottom rail left side plate disposed at the bottom rail left side;
- the bottom rail top side being open and forming a bottom rail interior space defined by the bottom rail first end, the bottom rail second end, the bottom rail bottom side, the bottom rail right side and the bottom rail left side;

a bottom rail screw shaft along the horizontal length of the bottom rail, disposed within the bottom rail interior space and coupled at the bottom rail first end and at the bottom rail second end;
- the bottom rail screw shaft couples a sliding block bottom interface with the bottom rail interior space such that the sliding block fits within the bottom rail and longitudinally slides along the length of the bottom rail;

a bottom rail chassis pin at a planar center of the bottom rail bottom side plate to pivot the bottom rail to the chassis;

a bottom rail steering rail control link pin disposed on one side of the bottom rails bottom side to couple with the steering control link;
- the bottom rail chassis pin and the bottom rail steering rail control link pin allow the bottom rail to swing when pushed by the steering control link; and a first limit switch, a second limit switch and a third limited switch disposed on the bottom rail left side to stop the sliding block movement when the sliding block reaches a desired location for the selected steering modes.

13. The four-wheel steering system of claim 1, wherein the rear steering system further comprises:
- a rear L-shaped pivot arm;
  - the rear L-shaped pivot arm comprising a rear L-shaped pivot arm first end and a rear L-shaped pivot arm second end that is perpendicular to the first end in a same plane, with a first rear L-shaped pivot arm pin at an intermediate position between the first end and the second end;
- a rear L-shaped pivot arm groove disposed on the first end of the rear L-shaped pivot arm;
- an aperture disposed on the second end of the rear L-shaped pivot arm;
- the first rear L-shaped pivot arm pin at the intermediate position of the rear L-shaped pivot arm pivots the rear L-shaped pivot arm to the chassis;
- a second rear L-shaped pivot arm pin at a middle position on a rear wheel crossbar couples with the groove disposed on the first end of the rear L-shaped pivot arm to connect the rear L-shaped pivot arm to the rear L-shaped pivot arm; and
- a third rear L-shaped pivot arm pin disposed through the aperture disposed on the second end of rear L-shaped pivot arm to connect the rear L-shaped pivot arm to the steering mode interchanger.

\* \* \* \* \*